__United States Patent Office__
3,320,421
Patented May 16, 1967

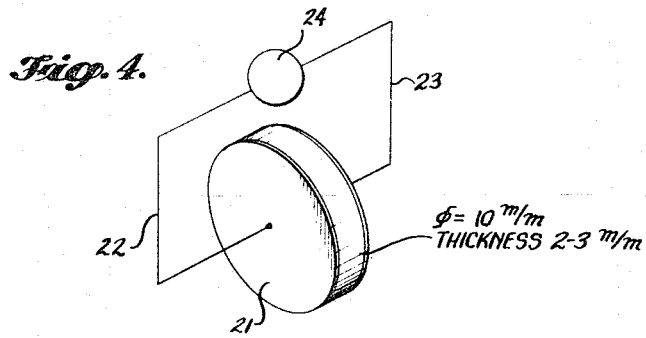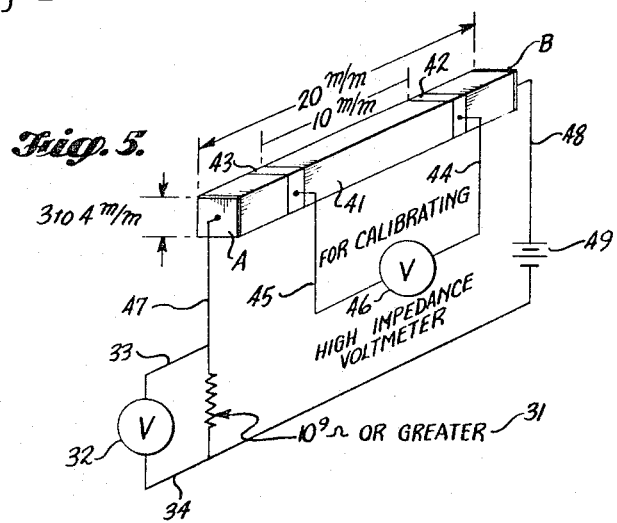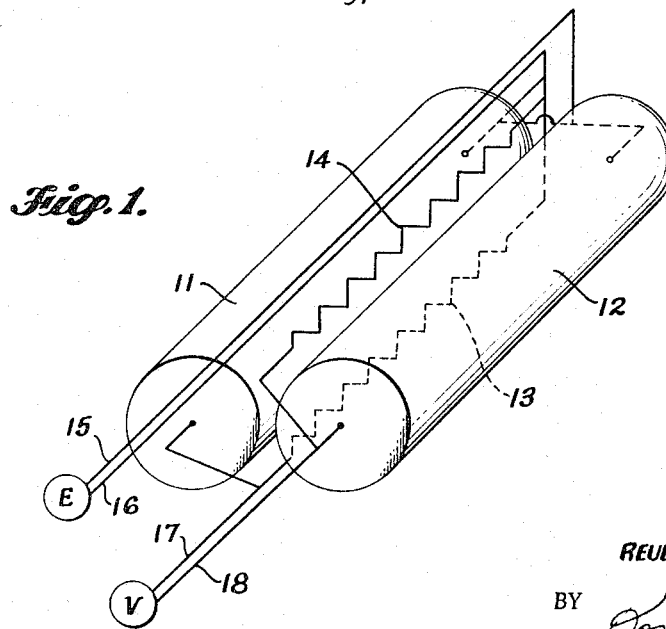

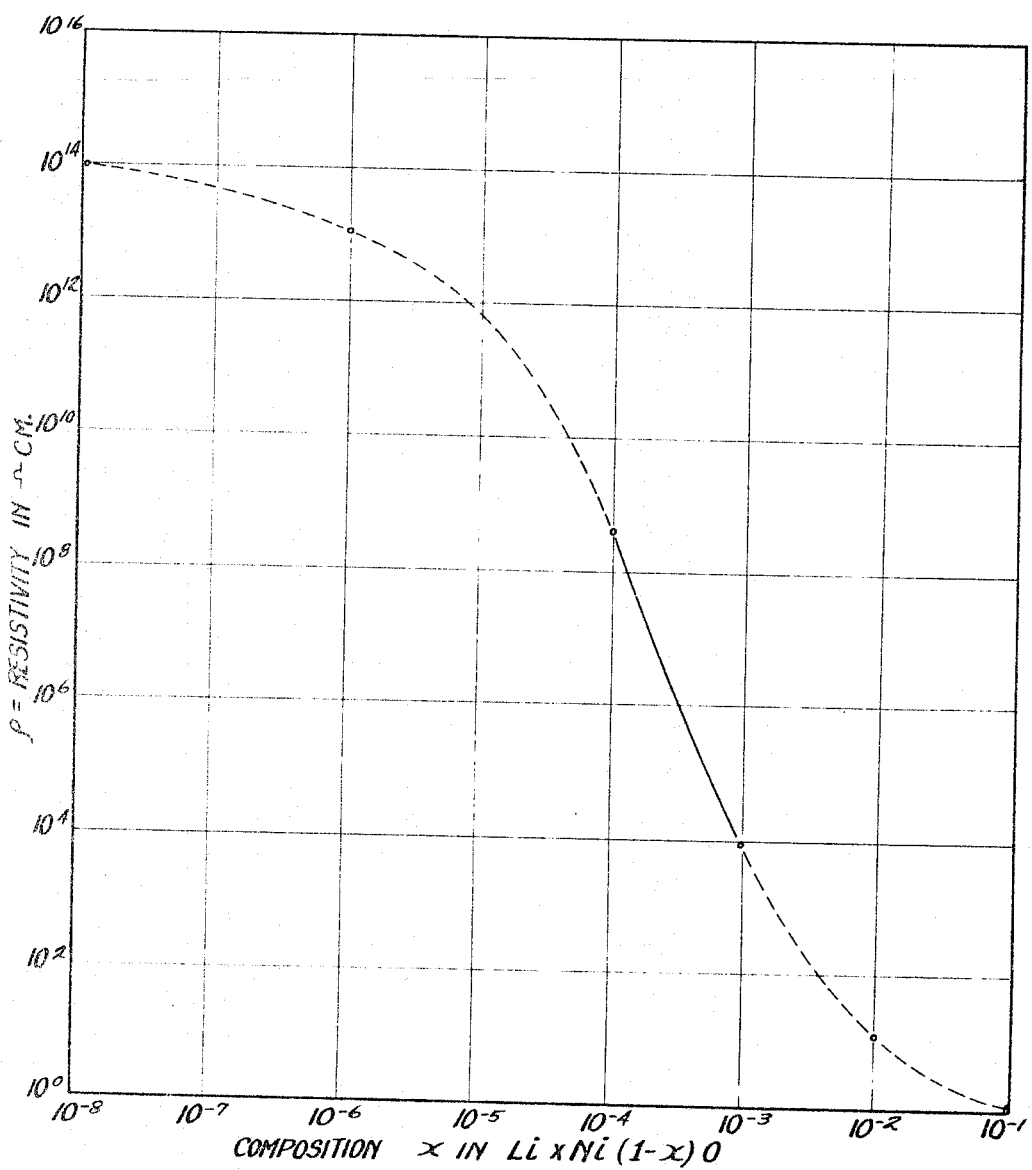

3,320,421
NEUTRON DOSIMETER COMPRISING NICKEL OXIDE WITH LITHIUM AS AN IMPURITY
Reuben S. Krogstad, Seattle, Wash., assignor to The Boeing Company, Seattle, Wash., a corporation of Delaware
Filed Feb. 27, 1964, Ser. No. 347,752
6 Claims. (Cl. 250—83.1)

This invention relates to a neutron detecting device and more particularly to a neutron detector which is an integrated flux monitor and dosimeter.

Prior to my invention many neutron detectors were large, expensive, relatively impractical for many purposes, and/or in many instances, did not satisfy the desired test requirements. Typically, these instruments consisted of boron lined ionization chambers, which are generally of a very large size. Other methods included diffused uranium fission into metal foils, induced radioactivity in metal foils, and neutron induced ionization.

An example of an earlier neutron detecting device is illustrated by U.S. Patent No. 2,564,626 issued Aug. 14, 1951, to Andrew M. MacMahon. The operation of this device was based upon changes in electrical resistance of boron or lithium metal resulting from the combined effects of "erosion" of material as well as structural changes brought about by neutron irradiation. Such a device suffers from the inherent limitation of low sensitivity, lack of compensation for temperature changes, charged particle irradiation effects and non-linearity of response.

Other neutron detector systems are shown by U.S. Patent No. 2,988,639 issued June 13, 1961, and also by U.S. Patent No. 2,867,727 issued Jan. 6, 1959, to Heinrick Welker and Rolf Gremmelmaier. These devices are all based upon the changes in electrical properties of boron compounds or nitrogen compounds resulting from the nuclear reactions $B^{10}$ (n, $\alpha$)$Li^7$ and $N^{14}$(n, p)$C^{14}$ or $N^{14}$(n, $\alpha$)$B^{11}$. These systems do not depend upon neutron induced changes in electrical properties due to addition or removal of doping materials in a semiconductor.

However, none of these previously known methods provided a simple, reliable, integrated neutron flux monitor and neutron dosimeter.

Accordingly, it is a principal object of this invention to provide a device capable of operating both as a neutron flux monitor and a neutron dosimeter.

In addition, it is an object of this invention to eliminate complicated electrical circuitry and bulky equipment.

It is a further object of this invention to provide an instrument limited substantially to neutron detection which is suitable for on-site use.

A still further object of my invention is to provide a simple, reliable method for detecting neutrons and measuring the quantity produced over a period of time and also the rate of production in particular environments.

In order to achieve these objects I have developed a neutron detecting device and method which uses a detector element of a material which changes in electrical characteristics in proportion to the addition or deletion of a particular impurity.

In one embodiment I have combined into the primary material of the detector element a substance which transforms into the impurity which induces changes in electrical characteristics of the primary material of the detector element substantially in direct proportion to the amount of exposure to neutron radiation.

In another embodiment I have combined into the primary material of the detector element an impurity which proportionately affects the electrical characteristics of the primary material and is transformed into a substance that does not affect the electrical characteristics of the primary material. When exposed to neutrons the amount of impurity proportionately decreases and the corresponding change in electrical characteristics can be measured.

Hence, it is apparent that these changes in electrical characteristics can be measured by suitable means and calibrated so as to give an accurate indication of the quantity of neutrons present in the area to which the neutron detector element is exposed.

An analysis of the operation of such a neutron detector element shows that it depends upon several basic principles. One of these principles is that the electrical characteristics of the primary material of the detector element must be proportionately sensitive to addition or deletion of a particular impurity. In addition, this particular impurity must be capable of being added or deleted because of transmutation to another substance by neutron bombardment.

Semiconductors which can be made to vary in conductivity depending upon the presence or absence of an impurity transmutable by neutron bombardment are suitable for the basic material of the neutron detector element. Of course, it is necessary that this change in conductivity can be detected, measured, and proportionately related to the quantity of neutrons present in the vicinity to serve as an integrated neutron monitor and dosimeter. However, merely discriminatory detection is needed for the device to serve as a neutron monitor only. Many different means well known to those skilled in the art can be used to detect and measure the changes in electrical characteristics of the neutron detector elements. In the following exemplified embodiments, however, I have used the measurement of the change of resistivity as the means to determine neutron quantities.

The invention will be further explained with reference to the drawings in which:

FIG. 1 shows one embodiment of this invention in which a neutron detector element is an arm of a Wheatstone bridge.

FIG. 2 is a diagram showing the resistivity of nickel oxide as a function of lithium content.

FIG. 4 shows a sample of a neutron detector element which is part of a simple electrical circuit and responsive measuring means.

FIG. 5 shows a different form of neutron detector element connected into somewhat more sophisticated electrical circuitry and measuring means.

Figure 3:
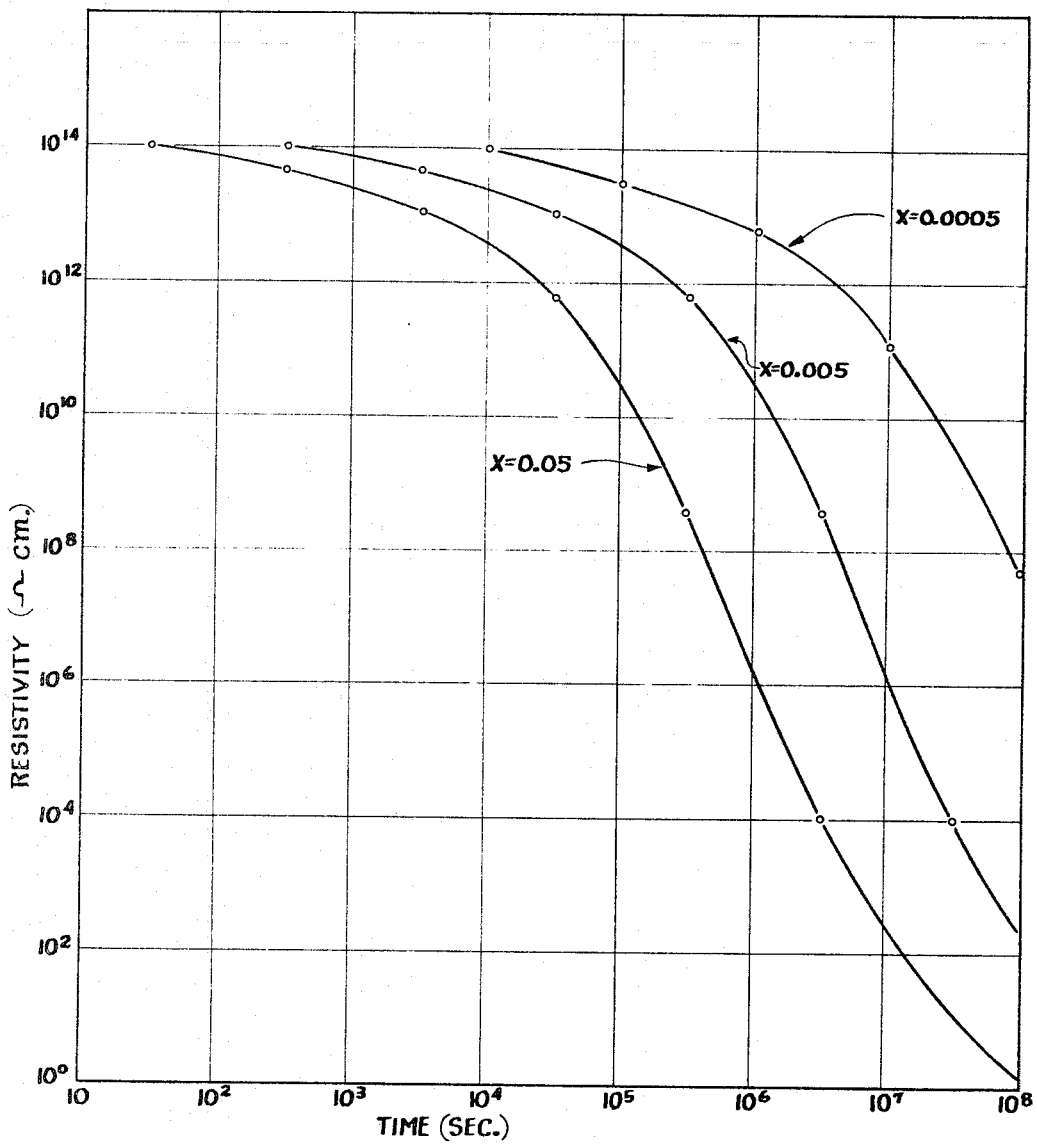
FIG. 3 is a graph comparing the resistivity variance of nickel oxide samples with different proportions of boron as a function of time.

In applying the aforementioned principles in a particular example I have found that the electrical resistivity of the semiconductor nickel oxide will vary directly in proportion to the amount of lithium impurity present. Also, the amount of lithium impurity can be increased or decreased proportionately to the amount of neutron bombardment. Thus, it would appear that a piece of nickel oxide in which the quantity of lithium can be varied would be a suitable detector element.

Studies that have been made have indicated that lithium, in the form of lithium oxide, added to nickel oxide can transform nickel oxide, which is normally an insulator, into a conductor. The explanation for this is that, in an energy level scheme consisting of full, localized $Ni^{2+}$ levels with empty $Ni^+$ levels approximately 5 e.v. above them, $Li^+.Ni^{2+}$ acceptor levels are at approximately 0.03 e.v. above the $Ni^{2+}$ levels. The electrical conduction may be described in terms of thermally activated diffusion of holes from one nickel ion to another. A detailed discussion of Semiconduction in $Li_xNi_{(1-x)}O$ by S. Van Houten printed in Great Britain in the Journal of Physics and Chemistry of Solids, Pergamon Press 1960, vol. 17, Nos. 1/2, pp. 7–17 is recommended reading for those who desire a more complete explanation of this phenomenon.

Also, if nickel oxide contains sufficient lithium impurity it is apparent that it will be an electrical conductor and that transmutation by means of neutron bombardment to another substance which does not have the same effect on the electrical resistivity as the lithium may provide a basis for measuring this difference and correlating it to the amount of neutron bombardment.

As particular applications of these studies lithium-7 isotope can be added to nickel oxide by neutron bombardment of the boron-10 isotope and lithium-6 isotope can be removed from nickel oxide by neutron bombardment causing transmutation to the hydrogen-3 isotope.

As a preferred embodiment of this invention a neutron detector element as described is incorporated into one arm of a Wheatstone bridge which is in a balanced condition. Then, when the detector element is exposed to neutrons the balance will be upset and a reading of the change in electrical characteristics can be correlated to the amount of neutron exposure to serve as a dosimeter. The fact that there is a change at all indicates that there are neutrons present in the vicinity which allows for the device to be used as a neutron monitor.

A crude device of this sort can be made to operate with the mere criteria that one arm only of a balanced Wheatstone bridge be a neutron detector element and that the other arms not be responsive to neutron radiation. However, I have found that, as a practical matter, it is preferable to have the arm of the Wheatstone bridge which is opposite the neutron detector arm made of a material which has, as nearly as possible, the same electrical characteristics as that of the neutron detector arm except that it not be responsive to neutron bombardment. In this way changes in environmental conditions such as heat, light, pressure, etc., would affect each arm the same and would not affect the ultimate read-out from the Wheatstone bridge. Thus, the only changes in the read-out would be due to the extent of neutron bombardment since only one arm is sensitive to neutron bombardment.

An example of materials which are especially suitable for use as "twin" arms of a Wheatstone bridge neutron detector apparatus are a lithium-6 isotope doped nickel oxide arm and a lithium-7 isotope doped nickel oxide arm. The lithium-6 isotope doped nickel oxide arm transforms to hydrogen-3 isotope when bombarded by neutrons. The nuclear reeaction $Li^6(n, \alpha)H^3$ cross-section has been determined for neutron energies up to 10 m.e.v. The lithium-7 isotope is not responsive to neutron bombardment but is otherwise the same as the lithium-6 isotope.

FIGURE 1 shows an arrangement of such materials in a Wheatstone bridge with 11 as the lithium-6 isotope doped nickel oxide arm and 12 as the lithium-7 isotope doped nickel oxide arm. 13 and 14 are each "inert" resistors. 15 and 16 are the electrical leads to the output voltage (E). 17 and 18 are the electrical leads to the applied voltage (V).

In such an arrangement of a Wheatstone bridge near balance condition, the output voltage (E) dependence on the resistivity change of one of the elements is shown by calculations from the equation:

$$\frac{dE}{dR} = V\left(\frac{1}{4R}\right) \text{ provided } \frac{dR}{R} \ll 1$$

where $V$=the applied voltage on the bridge.

An example of a Wheatstone bridge arrangement as in FIG. 1 would have two arms, 13 and 14, as "inert" resistors. The other two arms, 11 and 12, are lithium doped nickel oxide. However, one of the arms 11 is doped with lithium-6 which transmutates upon exposure to neutrons and the other arm 12 is doped with lithium-7 which does not transmutate when exposed to neutrons.

Initially, in the balanced condition, it can be shown that $$\frac{E}{V} = 1.22\sigma(nv)t \text{ as follows:}$$

Where $R_1$ is the lithium-6 doped arm 11, $R_2$ is the lithium-7 doped arm 12, $R_3$ is "inert" arm 13, $R_4$ is "inert" arm 14 and $R_1=R_2=R_3=R_4=R$.

$$E = V\left(\frac{R_1}{R_1+R_2} - \frac{R_3}{R_3+R_4}\right)$$

$$\frac{dE}{dR} = \frac{V}{4R} \text{ at balance}$$

$$\frac{dE}{d(nvt)} = \frac{dE}{dR}\frac{dR}{d\rho}\frac{d\rho}{dx}\frac{dx}{d(nvt)} \text{ at balance}$$

$$R = G\rho, \text{ where } G = \frac{\text{length}}{\text{area}}$$

therefore $$\frac{dR}{d\rho} = G$$

The diagram in FIGURE 2 shows the resistivity of nickel oxide as a function of lithium content as measured by F. J. Morin in Physics Review, 93, 1954, p. 1199 and F. J. Morin in "Oxides of the 3rd Transition Metals," Bell Systems Technical Journal, volume 37, 1958.

Referring to this diagram $$\rho = AX^{-4.88}, \frac{d\rho}{dx} = -4.88AX^{-5.88}$$

$$\frac{dx}{d(nvt)} = -\sigma X$$

Therefore $$\frac{dE}{d(nvt)} = \frac{V}{4G\rho} \times G \times (-4.88AX^{-5.88}) \times (-\sigma X)$$

(Here we see that the sensitivity is independent of the geometry of the elements since the geometry parameter G cancels out when deriving the sensitivity equation), and continuing further $$\frac{dE}{d(nvt)} = \frac{V}{4\rho}(+4.88A\sigma X^{-4.88})$$

$$= \frac{V}{4\rho}(+4.88\sigma\rho)$$

$$= \frac{V}{4}(4.88\sigma)$$

$$= 1.22\sigma V$$

or $$\frac{E}{V} = 1.22\sigma(nv)t$$

In other words, the ratio of output voltage to applied voltage has a linear dependence upon integrated neutron flux, because of "burnout" of lithium-6 in one arm of the bridge. The ratio of resistance change in the two lithium doped arms changes at about the same rate as the ratios of neutron cross-section (i.e. $945/.033 = 3 \times 10^4$). Hence, the lithium-7 doped element can be considered to be stable to neutron bombardment.

A typical example of sensitivity of this bridge arrangement in the measurement of thermal nuclear flux of $nv = 10^{12}$ per cm.$^2$, per sec.

$$\frac{E}{V} = 1.22 \times 945 \times 10^{-24} \times 10^{+12}t$$

$$= 1.15 \times 10^{-9}t$$

Thus, with an applied voltage of 100 v., an output voltage of approximately 10 millivolts per day will result. For an $nv$ of $10^{13}$ the results will be approximately 100 millivolts per day and for an $nv$ of $10^{11}$ one millivolt per day will be produced.

Such a bridge arrangement provides temperature compensation of the elements, that is, a temperature change will not contribute to the unbalance of the bridge. It also compensates for resistivity changes due to ionizing radiation such as gamma rays, X-rays, beta particles, alpha particles, etc., and because of the low resistivity of the sensitive elements the bridge is readily constructed and instrumented.

In addition, in this type of device the sensitivity is independent of the precise lithium concentration provided it is in the range $10^{-4} < X < 10^{-3}$. Hence, low tolerances in manufacturing requirements are admissible. The sensitivity is also independent of the geometry of the elements. This also permits low tolerance manufacturing requirements. To extend the linear range of the device a potentiometer arrangement where one element of the bridge is a variable resistor which restores the bridge to balance condition continuously can be used. The integrated flux in this modification would then be determined by the required resistivity compensation.

In another application of these principles I have developed a neutron detecting instrument and technique using nickel oxide containing a small proportion of boron-10 isotope as the neutron detector element. This boron can be added by various standard techniques used for doping semiconductor materials, such as nickel oxide, in order to make them suitable for use as components in electrical circuits. This boron-doped nickel oxide operates as a detector of neutrons because, when the boron-10 isotope is bombarded by a neutron it is transformed to the lithium-7 isotope. Then, since the electrical resistance of nickel oxide is extremely sensitive to lithium impurities, the change in resistivity can be measured by standard electrical means and correlated to the amount of neutron exposure of the detector element. Now, the boron with which the nickel oxide is doped normally contains 20% of the boron-10 isotope. It is this isotope of boron which neutron bombardment transforms into the lithium-7 isotope and with which we are primarily concerned, the equation for this transformation is $B^{10}(n, \alpha)Li^7$. This phenomenon is well known and has been of primary value when boron is used for nuclear shielding because this nuclear transformation does not create additional secondary gamma radiation which must be captured by additional thickness of lead or iron. An example of such use is discussed on page 544 of the book, The Rare Earths, by F. H. Spedding and A. H. Daane, published in 1961 by John Wiley and Sons, Inc.

As an example of the application of these principles, a sensing element made of sintered nickel oxide doped with about .005 to 0.05 atomic percent boron in the form of boron oxide is compounded. In one sample, powdered nickel oxide was mixed with boron oxide in a ball mill. The powder was then compacted in a hydraulic press and sintered in the atmosphere at 1100° C. The resulting material was cut into rectangular parallelepipeds and electrodes were attached by firing a liquid platinum coating. The initial boron concentration was approximately five atomic percent. The sensitivity of this device can be altered by varying the initial boron concentration and/or by using enriched boron-10 isotope. Since any impurities will affect the resistivity curve the consistency of the alloy should be well controlled.

A typical basic neutron detector device is shown in FIGURE 4 which consists of a boron oxide doped sample of sintered nickel oxide as the neutron detector element 21 with electrical contacts 22 and 23 attached. The electrical resistivity between the contacts will be monitored with standard direct current instrumentation 24 and the observed resistance will vary with the total number of neutrons absorbed in the sample.

FIGURE 5 is an illustration of another embodiment of this invention in which 41 is the boron doped nickel oxide detector element. For calibration purposes electrical leads 44 and 45 are attached, respectively, to the platinum coated areas 42 and 43 of the detector element. A voltmeter 46 is connected by means of electrical leads 44 and 45 to measure the change in voltage drop across the portions of the detector element from 42 to 43. Electrical leads 47 and 48 are connected to the platinum coated ends A and B, respectively of the detector element. In the circuit between electrical leads 47 and 48 is a source of direct current electromotive force 49 and a resistor 31. The resistor 31 should be $10^9$ ohms or greater. Across the resistor 31 the voltage drop is measured by voltmeter 32 interconnected into the circuit between electrical leads 47 and 48 by means of electrical leads 33 and 34 on either side of resistor 31. In this embodiment the detector element 41 was about three to four mm. thick, twenty mm. long and ten mm. between areas 42 and 43.

In order to show the change in resistivity with time samples of nickel oxide with 0.0005 percent, 0.005 percent and 0.05 percent boron are graphically diagrammed in FIGURE 3. In each of these samples the boron-doped nickel oxide was subjected to a thermal neutron flux of $10^{12}$ cm.$^{-2}$ sec.$^{-1}$. The results clearly show that as the boron-doped nickel oxide is subject to a greater exposure of neutrons the resistivity progressively decreases in proportionate manner. Also, the sample with the greater proportion of boron doping decreased in resistivity at a greater rate than did the sample with the lesser proportion of boron when exposed to similarly increasing quantities of neutrons. This is to be expected from the combination of the previously discussed phenomena of boron transformation to lithium when exposed to neutrons and nickel oxide decrease in resistivity as the lithium impurity is increased.

Although, the foregoing discussion has divulged several unique forms of neutron detectors superior in many respects to that what was known prior to these developments, it is to be understood that modifications and variations may be resorted to without departing from the spirit and scope of the invention, as those skilled in the art will readily understand.

I claim:
1. An instrument for detecting neutron radiation comprising a nickel oxide neutron detector element which varies in electrical resistivity in proportion to the quantity of lithium impurity contained therein, said detector element being doped with an isotope which transmutates in the presence of neutron radiation, and means to measure the change in electrical resistivity in the neutron detector element caused by changed quantities of lithium impurity contained therein.

2. A nickel oxide neutron radiation detector element which varies in electrical resistivity in proportion to the quantity of lithium impurity contained therein, said neutron detector element being doped with an additive selected from the group consisting of boron-10 isotope and lithium-6 isotope, and means to measure the change in electrical characteristics in the neutron detector element caused by changed quantities of lithium impurity contained therein.

3. A nickel oxide neutron radiation detector element which varies in electrical resistivity in proportion to the quantity of lithium impurity contained therein, said neutron detector element being doped with an additive selected from the group consisting of boron-10 and lithium-6 isotopes.

4. A neutron detector comprising a neutron detector element of nickel oxide being doped with an additive selected from the group consisting of boron-10 isotope and lithium-6 isotope, and means for measuring the change in electrical characteristics of said detector element in the presence of varying quantities of neutrons.

5. An instrument for detecting neutron radiation comprising a detector element of nickel oxide which is compounded with a sufficient quantity of substance selected from the group consisting of boron-10 isotope and lithium-6 isotope to cause a measurable change in resistance when exposed to neutron radiation and resistance measuring means connected to the detector element so as to measure the change in resistance of the detector element caused by exposure to neutron radiation.

6. An instrument for detecting neutron radiation as described in claim 5 wherein the resistance measuring means is electrical circuitry.

References Cited by the Examiner

UNITED STATES PATENTS

| | | | |
|---|---|---|---|
| 2,564,626 | 8/1951 | MacMahon et al. | 250—83.1 |
| 3,163,759 | 12/1964 | Cordy et al. | 250—83.1 |
| 3,201,590 | 8/1965 | Sun | 250—83.1 X |

FOREIGN PATENTS 1,315,942  12/1962  France.

ARCHIE R. BORCHELT, *Primary Examiner.*

RALPH G. NILSON, *Examiner.*